United States Patent
Kashi et al.

(10) Patent No.: US 8,428,245 B2
(45) Date of Patent: Apr. 23, 2013

(54) CUSTOMER SERVICE AGENT ASSISTED SOCIAL NETWORKS

(75) Inventors: Ramanujan Kashi, Magarpatta (IN); Valentine C. Matula, Granville, OH (US)

(73) Assignee: Avaya, Inc., Basking Ridge, NJ (US)

( * ) Notice: Subject to any disclaimer, the term of this patent is extended or adjusted under 35 U.S.C. 154(b) by 630 days.

(21) Appl. No.: 12/612,113

(22) Filed: Nov. 4, 2009

(65) Prior Publication Data

US 2011/0103567 A1    May 5, 2011

(51) Int. Cl.
*H04M 3/00* (2006.01)
*H04M 5/00* (2006.01)

(52) U.S. Cl.
USPC ........... 379/265.13; 379/265.01; 379/265.05; 379/265.11; 379/264

(58) Field of Classification Search ............ 379/202.01, 379/242, 265.01, 265.05, 265.11, 265.13, 379/264, 268, 269, 273; 705/9, 35
See application file for complete search history.

(56) References Cited

U.S. PATENT DOCUMENTS

| 6,735,300 | B2 | 5/2004 | Walker et al. | |
|---|---|---|---|---|
| 2002/0082960 | A1 * | 6/2002 | Goedken | 705/35 |
| 2010/0268571 | A1 * | 10/2010 | Davies et al. | 705/9 |

* cited by examiner

*Primary Examiner* — Thjuan K Addy

(57) ABSTRACT

The present invention comprises a method for: (i) receiving information from a caller $C_1$ and indexing the caller $C_1$ into a first group based, at least in part, on the received information, (ii) transmitting to a participant $P_1$, a first message requesting that the participant $P_1$ assist the caller $C_1$ indexed in the first group, (iii) establishing a conference call between the participant $P_1$ and the caller $C_1$ in response to the participant $P_1$ responding to the first message, (iv) transmitting the first message to a participant $P_2$ when the participant $P_1$ does not respond to the first message, (v) establishing a conference call between the participant $P_2$ and the caller $C_1$ in response to the participant $P_2$ responding to the first message, and (vi) connecting the caller $C_1$ with an agent $A_1$ when a response to the first message is not received from the participant $P_1$ and the participant $P_2$.

18 Claims, 9 Drawing Sheets

U S 8,428,245 B2

CUSTOMER SERVICE AGENT ASSISTED SOCIAL NETWORKS

FIELD OF THE INVENTION

The present invention relates to telecommunications in general, and, more particularly, to telecommunications call-centers.

BACKGROUND OF THE INVENTION

What are some of the services provided by a call-center?

A call-center, for example, provides a service that allows a customer to contact a call-center agent to obtain information on a product. These services provided by the call-center comprise, for example, guidance on how to operate or troubleshoot the product.

In many cases, call-centers are overwhelmed with a high volume of incoming calls from customers that would like to obtain information on a product. Since some call-centers do not have a sufficient number of call-center agents to answer these incoming calls, the customers are put-on-hold (e.g., in a waiting queue) until a call-center agent is available. In this situation, the customers may become angry, annoyed, and frustrated since they are put-on-hold for an extended period of time. Additionally, a call-center's expenses may increase since additional call-center agents must be hired to handle the high volume of incoming calls.

Therefore, there exists a need for a more accommodating call-center that can quickly assist customers in obtaining information on a product.

SUMMARY OF THE INVENTION

The present invention provides a call-center that avoids some of the costs and disadvantages associated with call-centers in the prior art.

When a caller $C_1$ contacts a call-center via a caller telecommunications terminal to obtain information on a product, the caller $C_1$'s telecommunications terminal is connected to a call-processing switch. Once connected, the call-processing switch:
  i. transmits a message to the caller $C_1$'s telecommunications terminal, and
  ii. receives information (e.g., responses to an interactive voice response system) from the caller $C_1$ via the caller $C_1$'s telecommunications terminal.

This process of transmitting a message and receiving a response can be performed several times to identify a group that is most closely related to the caller $C_1$'s request for obtaining information.

Once the call-processing switch has received the caller $C_1$'s responses to the messages, the call-processing switch identifies a first group among a plurality of groups based, at least in part, on the caller $C_1$'s responses. The caller $C_1$ is indexed in the first group which may comprise the caller $C_1$ himself or other callers (e.g., caller $C_2$, caller $C_3$, caller $C_4$, etc.).

After indexing the caller $C_1$ in the first group, the call-processing switch identifies from a plurality of participants, a participant $P_1$ that has agreed to assist callers indexed in the first group. This participant $P_1$, for example, is a caller that was previously indexed in the first group, and, because the participant $P_1$ was successfully assisted by a call-center agent in the past, the participant $P_1$ has the knowledge to assist the callers indexed in the first group.

After the participant $P_1$ has been identified by the call-processing switch, a first message is transmitted to the participant $P_1$'s telecommunications terminal. This message is requesting that the participant $P_1$ assist the caller $C_1$ and any other callers indexed in the first group.

When a response to the first message is received from the participant $P_1$'s telecommunications terminal and the response indicates that the participant $P_1$ is available to establish a conference call, the call-processing switch establishes a conference call between the participant $P_1$, the caller $C_1$, and the other callers indexed in the first group.

On the other hand, if a response is not received from the participant $P_1$'s telecommunications terminal, the call-processing switch identifies a participant $P_2$ that has also agreed to assist callers indexed in the first group. After the participant $P_2$ has been identified by the call-processing switch, the first message is transmitted to the participant $P_2$'s telecommunications terminal.

When a response to the first message is received from the participant $P_2$'s telecommunications terminal and the response indicates that the participant $P_2$ is available to establish a conference call, the call-processing switch establishes a conference call between the participant $P_2$, the caller $C_1$, and the other callers indexed in the first group.

When a response to the first message is not received from the participant $P_1$'s telecommunications terminal and the participant $P_2$'s telecommunications terminal, the caller $C_1$ and the other callers are connected to a call-center agent $A_1$.

One advantage of the illustrative embodiment is that the participant $P_1$ and the participant $P_2$ were callers previously indexed in the first group. This is advantageous because participant $P_1$ and participant $P_2$ previously had the same or a similar problem as the caller $C_1$, and, because participant $P_1$ and participant $P_2$ were successfully assisted by a call-center agent in the past, participant $P_1$ and participant $P_2$ have the knowledge to assist the callers indexed in the first group.

Thus, the present invention reduces a call-center's expenses and increases the efficiency of the call-center by:
  i. reducing the number of callers that are put-on-hold, and
  ii. reducing the need to hire additional call-center agents to handle the high volume of incoming calls.

The illustrative embodiment of the present invention comprises: (i) receiving information from a caller $C_1$ and indexing the caller $C_1$ into a first group based, at least in part, on the information from the caller $C_1$, (ii) transmitting to a participant $P_1$, a first message requesting that the participant $P_1$ assist the caller $C_1$ indexed in the first group, wherein the first message is transmitted to the participant $P_1$ based, at least in part, on identifying that the participant $P_1$ is a participant of the first group, (iii) establishing a conference call between the participant $P_1$ and the caller $C_1$ in response to the participant $P_1$ responding to the first message, and (iv) connecting the caller $C_1$ with an agent $A_1$ when a response to the first message is not received from the participant $P_1$.

DETAILED DESCRIPTION

Figure 1:
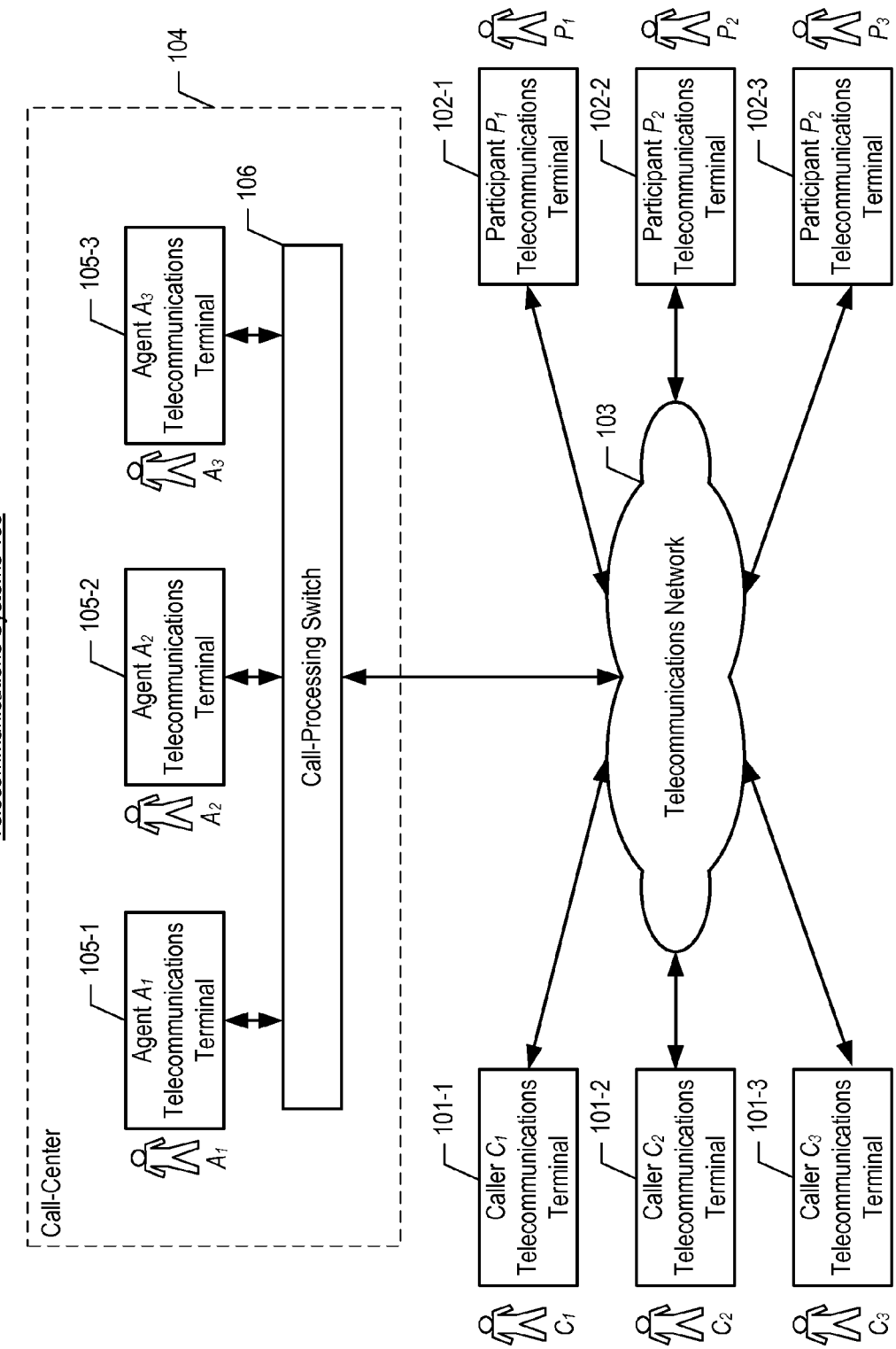
FIG. 1 depicts a schematic diagram of the salient components of telecommunications systems 100 in accordance with the illustrative embodiment of the present invention.

FIG. 1 depicts a schematic diagram of the salient components of telecommunications systems 100 in accordance with the illustrative embodiment of the present invention.

Telecommunications systems 100 comprises: caller telecommunications terminals 101-1 through 101-3, participant telecommunications terminals 102-1 through 102-3, telecommunications network 103, and call-center 104, which comprises agent telecommunications terminal 105-1 through agent telecommunications terminal 105-3 and call processing switch 106, interconnected as shown.

Although the illustrative embodiment comprises three caller telecommunications terminals 101-1 through 101-3, it will be clear to those skilled in the art, after reading this disclosure, how to make and use alternative embodiments of the present invention that comprises any number of caller telecommunications terminals (e.g., four caller telecommunications terminals, five caller telecommunications terminals, six caller telecommunications terminals, etc.)

Although the illustrative embodiment comprises three participant telecommunications terminals 102-1 through 102-3, it will be clear to those skilled in the art, after reading this disclosure, how to make and use alternative embodiments of the present invention that comprises any number of participant telecommunications terminals (e.g., four participant telecommunications terminals, five participant telecommunications terminals, six participant telecommunications terminals, etc.)

Although the illustrative embodiment comprises one telecommunications network 103, it will be clear to those skilled in the art, after reading this disclosure, how to make and use alternative embodiments of the present invention that comprises any number and combination of telecommunications networks.

Although the illustrative embodiment comprises one call-center 104, it will be clear to those skilled in the art, after reading this disclosure, how to make and use alternative embodiments of the present invention that comprises any number of call-centers.

Although the illustrative embodiment comprises three agent telecommunications terminal 105-1 through 105-3, it will be clear to those skilled in the art, after reading this disclosure, how to make and use alternative embodiments of the present invention that comprises any number of agent telecommunications terminals (e.g., four agent telecommunications terminals, five agent telecommunications terminals, six agent telecommunications terminals, etc.)

Although the illustrative embodiment comprises one call-processing switch 106, it will be clear to those skilled in the art, after reading this disclosure, how to make and use alternative embodiments of the present invention that comprises any number or any combination of call-processing switches.

Caller $C_i$, wherein $i \in \{1, 2, 3\}$, is a person who desires product information from participant $P_j$ and agent $A_k$, wherein $j \in \{1, 2, 3\}$ and $k \in \{1, 2, 3\}$, respectively. In accordance with the illustrative embodiment, one or more callers could establish voice calls with call-center 104 at the same time.

Caller telecommunications terminal 101-$i$ comprises hardware and software that enables a caller $C_i$ to contact and interact with:
  i. participant telecommunications terminal 102-$j$, and
  ii. call-center 104, and
  iii. agent telecommunications terminal 105-$k$, and
  iv. call-processing switch 106, and
  v. participant telecommunications terminal 102-$j$ and agent telecommunications terminal 105-$k$ in a conference call on a teleconferencing bridge
through telecommunications network 103.

In accordance with the illustrative embodiment, caller telecommunications terminal 101-$i$ are wireless telecommunications terminals (e.g., a cell phone, a personal digital assistant, a smart-phone, etc.), but it will be clear to those skilled in the art, after reading this disclosure, how to make and use alternative embodiments of the present invention in which some or all of the caller telecommunications terminals connect to telecommunications network 103 via wireline (e.g., an office deskset, a desktop, a computer, etc.).

Additionally, it will be clear to those skilled in the art, after reading this disclosure, how to make and use alternative embodiments of the present invention in which caller terminal 101-$i$ enables a caller to contact call-center 104 via a different modality, for example, and without limitation, web requests, e-mail, instant messaging, short-message service, video, etc. In any case, it will be clear to those skilled in the art how to make and use caller telecommunications terminal 101-$i$.

Participant telecommunications terminal 102-$j$ comprises hardware and software that enables a participant $P_j$ to contact and interact with:
  i. caller telecommunications terminal 101-$i$, and
  ii. call-center 104, and
  iii. agent telecommunications terminal 105-$k$, and
  iv. call-processing switch 106, and
  v. caller telecommunications terminal 102-$i$ and agent telecommunications terminal 105-$k$ in a conference call on a teleconferencing bridge
through telecommunications network 103.

In accordance with the illustrative embodiment, participant telecommunications terminals 102-$j$ are wireless telecommunications terminals (e.g., a cell phone, a personal digital assistant, a smart-phone, etc.), but it will be clear to those skilled in the art, after reading this disclosure, how to make and use alternative embodiments of the present invention in which some or all of the participant telecommunications terminals connect to telecommunications network 103 via wireline (e.g., an office deskset, a desktop, a computer, etc.).

Additionally, it will be clear to those skilled in the art, after reading this disclosure, how to make and use alternative embodiments of the present invention in which participant terminal 102-$j$ enables a participant to contact call-center 104 via a different modality, for example, and without limitation, web requests, e-mail, instant messaging, short-message service, video, etc. In any case, it will be clear to those skilled in the art how to make and use participant telecommunications terminal 102-*j*.

Telecommunications network 103 is the Public Switched Telephone Network (PSTN), but it will be clear to those skilled in the art, after reading this disclosure, how to make and use alternative embodiments of the present invention in which telecommunications network 103 is a different network or a combination of different networks (e.g., the Internet, a private data network, a satellite network, etc.)

Call-Center 104 is a building for housing agent telecommunications terminal 105-*k*, an agent $A_k$ associated with the agent telecommunications terminal 105-*k*, and call-processing switch 106. In accordance with the illustrative embodiment, agent telecommunications terminal 105-*k* and the agent $A_k$ are co-located with call-processing switch 106 in call-center 104, but it will be clear to those skilled in the art, after reading this disclosure, how to make and use alternative embodiments of the present invention in which some or all of the agent telecommunications terminals and the agents are not co-located with call-processing switch 106.

Agent telecommunications terminal 105-*k* comprises hardware and software that enables an agent $A_k$ to contact and interact with caller telecommunications terminal 101-*i*, participant telecommunications terminal 102-*j*, and call-processing switch 106 in well-known fashion. It will be clear to those skilled in the art, after reading this disclosure, how to make and use alternative embodiments of the present invention in which agent $A_k$ associated with agent terminal 105-*k* could contact caller telecommunications terminal 101-*i* and participant telecommunications terminal 102-*j* via a different modality, for example, and without limitation, e-mail, instant messaging, short-message service, video, etc.

Call-processing switch 106 provides, for example, the functionality of a private-branch exchange that receives incoming calls from caller telecommunications terminal 101-*i* and participant telecommunications terminal 102-*j* through telecommunications network 103. The call-processing switch 106 is configured to direct incoming calls to:
  i. participant telecommunications terminal 102-*j*, or
  ii. agent telecommunications terminal 105-*k*, or
  iii. an interactive voice response (IVR), or
  iv. any combination of i, ii, and iii.

In accordance with the illustrative embodiment, call-processing switch 106 is configured so that an incoming call from a caller telecommunications terminal 101-*i* is initially presented with an interactive voice response, and, based at least in part on the caller $C_i$'s responses to the interactive voice response, the caller $C_i$ is indexed in a group among a plurality of groups. Once the caller $C_i$ is indexed in a group, the call-processing switch 106 routes the caller $C_i$ to an appropriate telecommunications terminal (i.e., participant telecommunications terminal 102-*j* or agent telecommunications terminal 105-*k*). In particular, call-processing switch 106 is capable of performing the tasks described below and in the accompanying figures.

Figure 2:
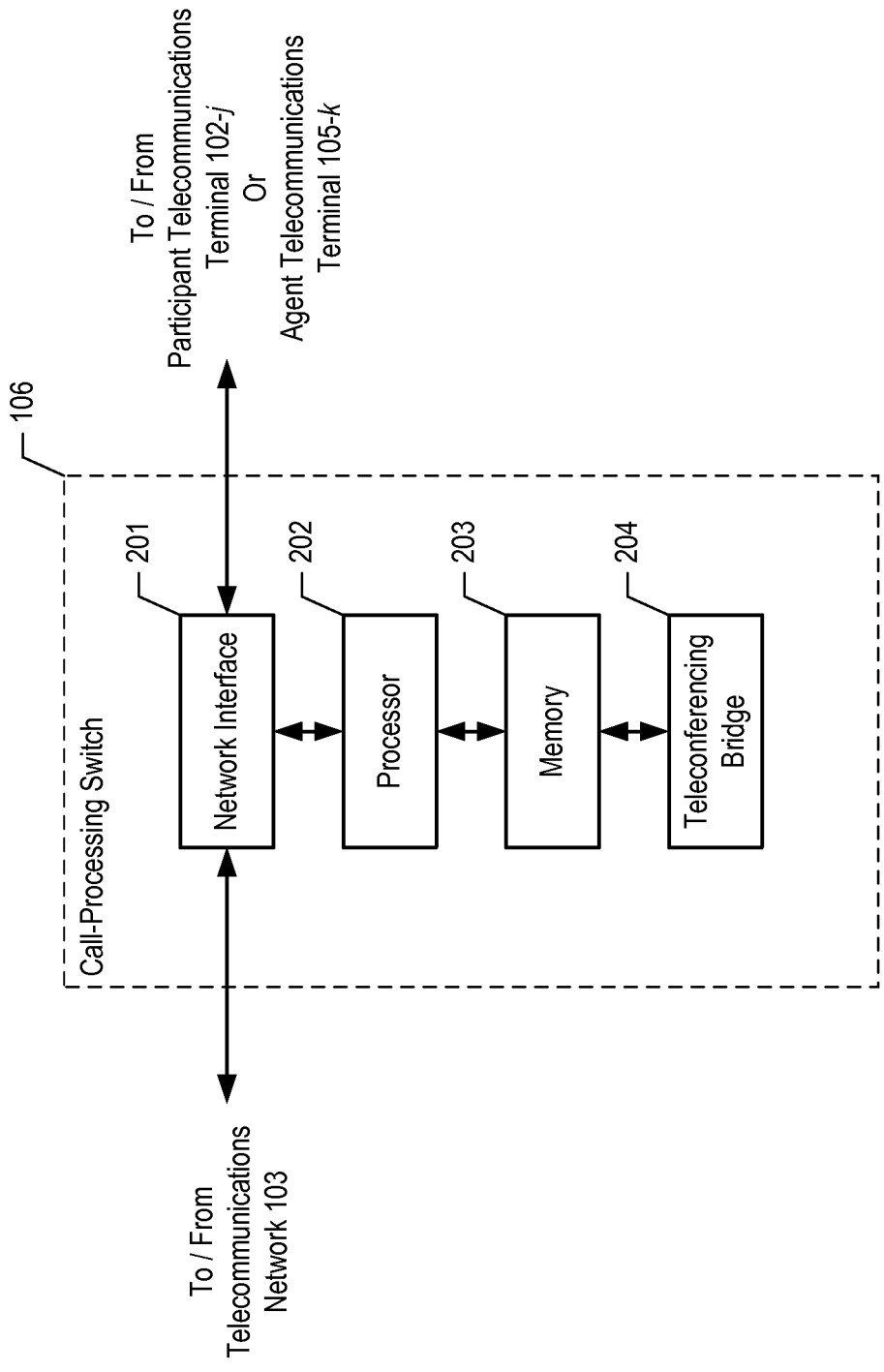
FIG. 2 depicts the salient components of call-processing switch 106.

FIG. 2 depicts the salient components of call-processing switch 106.

Call-processing switch 106 comprises network interface 201, processor 202, memory 203, and teleconferencing bridge 204 interconnected as shown. It will be clear to those skilled in the art, after reading this disclosure, how to make and use alternative embodiments of the present invention in which call-processing switch 106 comprises any subcombination of the components listed above.

Network interface 201 comprises the circuitry that enables call-processing switch 106 to receive signals from and transmit signals to any telecommunications terminal such as caller telecommunications terminal 101-*i*, participant telecommunications terminal 102-*j*, and agent telecommunications terminal 105-*k* in well-known fashion.

Processor 202 is a general-purpose processor that is capable of receiving information from and transmitting information to network interface 201, executing instructions stored in memory 203 including the instructions that correspond to the tasks of the illustrative embodiment, and reading data from and writing data into memory 203. In some alternative embodiments of the present invention, processor 202 might be a special-purpose processor.

Memory 203 stores the instructions and data used by processor 202, in well-known fashion. Memory 203 can be any combination of dynamic random-access memory (RAM), flash memory, disk drive memory, and so forth.

Teleconferencing bridge 204 comprises hardware and software that enables caller telecommunications terminals 101-*i*, participant telecommunications terminal 102-*j*, and agent telecommunications terminal 105-*k* to connect and communicate with one another. At designated times, call-processing switch 106 is configured to set up one or more teleconferencing bridges to allow multiple telecommunications terminals to connect with one another. Additionally, call-processing switch 106 is configured to schedule more than one conference call on the same teleconferencing bridge at the same time. These teleconferencing bridges can host conference calls with as few as two people, with no pre-set upper limit on the number of telecommunications terminals in a conference call. Furthermore, these teleconferencing bridges can be part of or, separate from, the call-processing switch 106. It will be clear to those skilled in the art, after reading this disclosure, how to make and use teleconferencing bridge 204.

Figure 3:
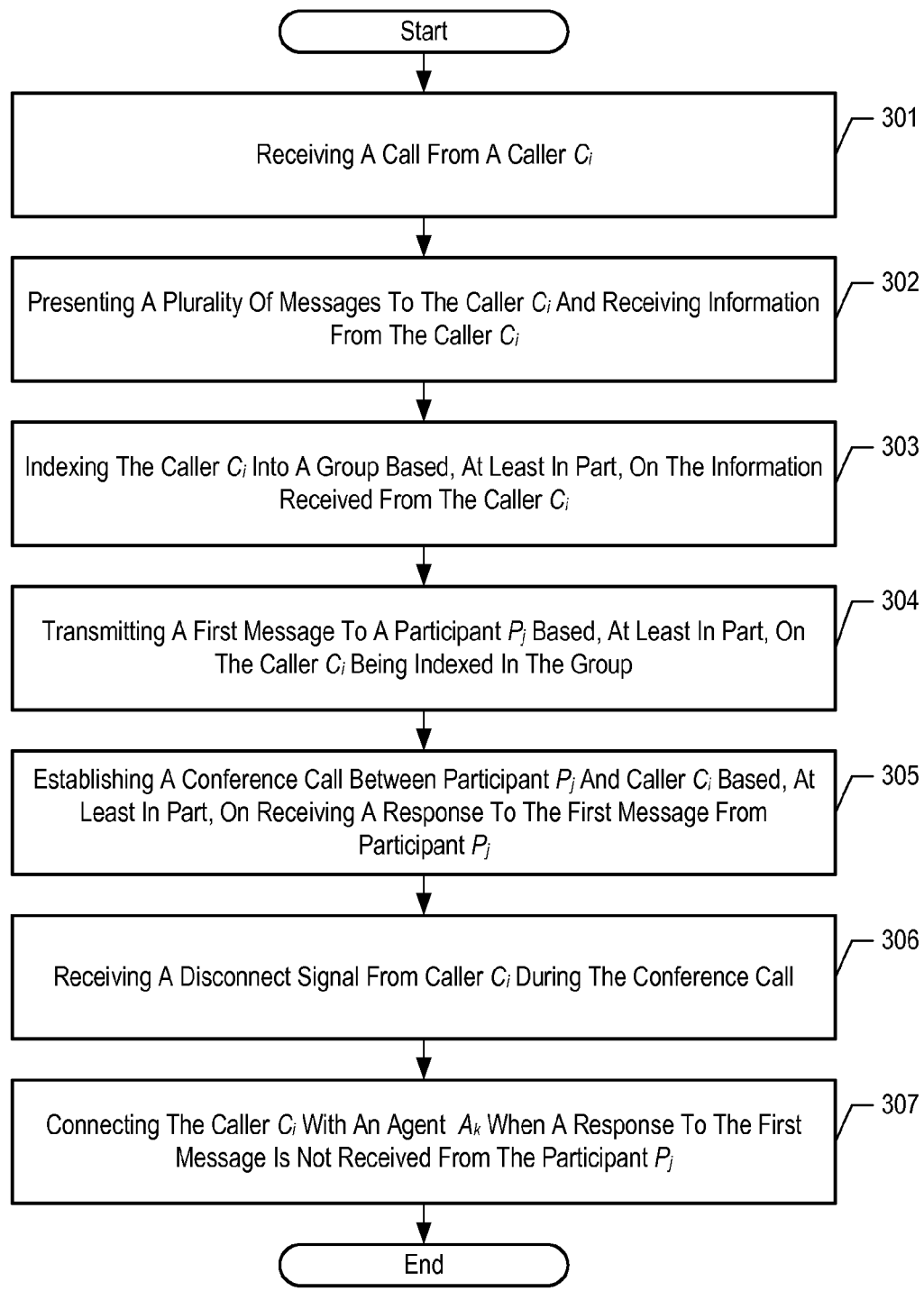
FIG. 3 depicts a flowchart of the salient tasks associated with the operation of the illustrative embodiment of the present invention.

FIG. 3 depicts a flowchart of the salient tasks associated with the operation of the illustrative embodiment of the present invention.

It will be clear to those skilled in the art, after reading this disclosure, how to make and use alternative embodiments of the present invention in which tasks 301, 302, 303, 304, 305, 306, and 307 are performed in a different order or are performed concurrently. Furthermore, it will be clear to those skilled in the art, after reading this disclosure, how to make and use alternative embodiments of the present invention that omit one or more tasks 301, 302, 303, 304, 305, 306, and 307.

At task 301, the call-processing switch 106 receives a call from a caller $C_1$ via a caller telecommunications terminal 101-1. In accordance with the illustrative embodiment, caller $C_1$ is contacting call-center 104 and call-processing switch 106 to obtain information on a product via a wireless telecommunications terminal (e.g., a cell phone, a personal digital assistant, a smart-phone, etc.), but it will be clear to those skilled in the art after reading this disclosure, how to make and use alternative embodiments of the present invention in which caller $C_1$ contacts call-center 104 and call-processing switch 106 via a wireline telecommunications terminal (e.g., an office deskset, a desktop, a computer, etc.).

At task 302, the call-processing switch 106 is configured to initially present an interactive voice response (IVR) to the caller $C_1$ upon receiving an incoming call from the caller telecommunications terminal 101-1. For example, the interactive voice response initially presents the caller $C_1$ with a first question, and, after receiving a response to the first question from caller $C_1$'s telecommunications terminal 101-1, a second question is presented to the caller $C_1$.

In accordance with the illustrative embodiment, an interactive voice response (IVR) is used by the call-processing switch 106 to determine the type of information the caller $C_1$ desires to obtain. More particularly, an interactive voice response is presented to the caller $C_1$'s telecommunications terminal 101-1. The call-processing switch 106 receives one or more responses from the caller $C_1$ via the caller $C_1$'s telecommunications terminal 101-1 (e.g., receiving the caller $C_1$'s responses to the first question and the second question), which are then used to index the caller $C_1$ in a first group among a plurality of groups that is most closely related to the caller $C_1$'s request to obtain information.

It will be clear to those skilled in the art, after reading this disclosure, how to make and use alternative embodiments of the present invention in which the call-processing switch 106 determines the type of information the caller $C_1$ is calling to obtain by receiving, for example, and without limitation:

i. an e-mail transmitted from caller $C_1$'s telecommunications terminal 101-1 to the call-processing switch 106, or ii. an instant message transmitted from caller $C_1$'s telecommunications terminal 101-1 to the call-processing switch 106, or iii. a short-message service transmitted from caller $C_1$'s telecommunications terminal 101-1 to the call-processing switch 106, or iv. a video request transmitted from caller $C_1$'s telecommunications terminal 101-1 to the call-processing switch 106, or v. a web request transmitted from caller $C_1$'s telecommunications terminal 101-1 to the call processing switch 106, or vi. a signal transmitted from caller $C_1$'s telecommunications terminal 101-1 to the call-processing switch 106 that includes the telephone number of caller $C_1$'s telecommunications terminal 101-1, or vii. any combination of i, ii, iii, iv, v, and vi.

Additionally, it will be clear to those skilled in the art, after reading this disclosure, how to make and use alternative embodiments of the present invention in which the call-processing switch 106 analyzes, for example, and without limitation:

i. the information encoded in the e-mail transmitted by the caller $C_1$'s telecommunications terminal 101-1 (e.g., the text in the subject field of the e-mail, the text in the body of the e-mail, etc.), or ii. the information encoded in the instant message transmitted by the caller $C_1$'s telecommunications terminal 101-1 (e.g., the text in the body of the instant message), or iii. the information encoded in the short-message service transmitted by the caller $C_1$'s telecommunications terminal 101-1 (e.g., the text in the subject field of the short-message service, the text in the body of the short-message service, etc.), or iv. the information encoded in the web request transmitted by the caller $C_1$'s telecommunications terminal 101-1 (e.g., a set of web interaction steps, such as selecting an option from a drop-down list, inputting information into one or more fields, etc.), or v. any combination of i, ii, iii, and iv, to determine the type of information the caller $C_1$ desires to obtain.

Additionally, it will be clear to those skilled in the art, after reading this disclosure, how to make and use alternative embodiments of the present invention in which the call-processing switch 106 analyzes the incoming call from caller $C_1$'s telecommunications terminal 101-1 with an automatic number identification (ANI) equipment. The call-processing switch 106 uses the automatic number identification equipment to identify the telephone number of caller $C_1$'s telecommunications terminal 101-1, which is used to search, reference, and determine the topic of caller $C_1$'s past calls. Based on this determination, the call-processing switch 106 indexes the caller $C_1$ in a first group among a plurality of groups that is most closely related to the caller $C_1$'s past calls.

Similar to the automatic number identification (ANI) equipment used by the call-processing switch 106 to identify the telephone number of caller $C_1$'s telecommunications terminal 101-1, it will be clear to those skilled in the art, after reading this disclosure, how to make and use alternative embodiments of the present invention in which the call-processing switch 106 also comprises the hardware and software to enable it to analyze, for example, and without limitation:

i. the e-mail transmitted by the caller $C_1$'s telecommunications terminal 101-1 to identify the identity of the caller $C_1$, or ii. the instant message transmitted by the caller $C_1$'s telecommunications terminal 101-1 to identify the identity of the caller $C_1$, or iii. the short-message service transmitted by the caller $C_1$'s telecommunications terminal 101-1 to identify the identity of the caller $C_1$, or iv. the web request transmitted by the caller $C_1$'s telecommunications terminal 101-1 to identify the identity of the caller $C_1$, or v. any combination of i, ii, iii, and iv, which is used by the call-processing switch 106 to search, reference, and determine the topic of caller $C_1$'s past calls. Based on this determination, the call-processing switch 106 indexes the caller $C_1$ in a first group among a plurality of groups that is most closely related to the caller $C_1$'s past request for obtaining information. Task 302 is described in detail below and with respect to FIG. 4.

At task 303, the call-processing switch 106 indexes the caller $C_1$ in a first group among a plurality of groups based, at least in part, on the information received from the caller $C_1$. It will be clear to those skilled in the art, after reading this disclosure, how to make and use alternative embodiments of the present invention in which the group that the caller $C_1$ is indexed in may include the caller $C_1$ himself or other callers (e.g., caller $C_2$, caller $C_3$, caller $C_4$, etc.). Task 303 is described in detail below and with respect to FIG. 5.

At task 304, the call-processing switch 106 identifies from a plurality of participants, a participant $P_1$ that has agreed to assist one or more callers indexed in the first group. Once the participant $P_1$ has been identified by the call-processing switch 106, a first message is transmitted to the participant $P_1$'s telecommunications terminal 102-1. The first message comprises a request that the participant $P_1$ assist the caller $C_1$ and any other callers indexed in the first group by, for example, and without limitation, providing the callers indexed in the first group with information pertaining to their product inquiry.

As part of task 304, if a response is not received from the participant $P_1$'s telecommunications terminal 102-1, the call-processing switch 106 identifies a participant $P_2$ that has also agreed to assist one or more callers indexed in the first group. After the participant $P_2$ has been identified by the call-processing switch 106, the first message is transmitted to the participant $P_2$'s telecommunications terminal 102-2 in which the first message is a request that the participant $P_2$ assist the caller $C_1$ and any other callers indexed in the first group.

In accordance with the illustrative embodiment, the first message transmitted from the call-processing switch 106 to participant $P_1$'s telecommunications terminal 102-1 and participant $P_2$'s telecommunications terminal 102-2 is a text message, but it will be clear to those skilled in the art, after reading this disclosure, how to make and use alternative embodiments of the present invention in which the first message transmitted from the call-processing switch 106 to participant $P_1$'s telecommunications terminal 102-1 and participant $P_2$'s telecommunications terminal 102-2 could be, for example, and without limitation:
   i. a short-message service, or
   ii. an e-mail, or
   iii. an instant message, or
   iv. a web alert, or
   v. a voice message, or
   vi. a video message, or
   vii. any combination of i, ii, iii, iv, v, and vi.

Additionally, in accordance with the illustrative embodiment, the first message is transmitted to participant $P_2$, when and only when, participant $P_1$ does not respond to the first message, but it will be clear to those skilled in the art, after reading this disclosure, how to make and use alternative embodiments of the present invention in which the first message is transmitted to participant $P_1$ and participant $P_2$ at the same time.

For example, the first message is transmitted to participant $P_1$'s telecommunications terminal 102-1 and participant $P_2$'s telecommunications terminal 102-2 at the same time, and, whoever responds to the message first will be selected by the call-processing switch 106 to assist the callers indexed in the first group. On the other hand, if no participants respond to the first message within a time limit, the callers indexed in the first group are connected with a call-center agent $A_k$. Task 304 is described in detail below and with respect to FIG. 6.

At task 305, if a response to the first message is received from the participant $P_1$'s telecommunications terminal 102-1 within a time limit and the response indicates that the participant $P_1$ is available to establish a conference call, the call-processing switch 106 establishes a conference call between the participant $P_1$, the caller $C_1$, and the other callers indexed in the first group.

As part of task 305, if a response to the first message is received from the participant $P_2$'s telecommunications terminal 102-2 within a time limit and the response indicates that the participant $P_2$ is available to establish a conference call, the call-processing switch 106 establishes a conference call between the participant $P_2$, the caller $C_1$, and the other callers indexed in the first group. Task 305 is described in detail below and with respect to FIG. 7.

At task 306, the call-processing switch 106 detects that the caller $C_1$'s telecommunications terminal 101-1 has disconnected from the conference call with participant $P_1$ or participant $P_2$. Once the call-processing switch 106 detects that the caller $C_1$'s telecommunications terminal 101-1 has disconnected from the conference call, the call-processing switch 106 transmits a second message to the caller $C_1$'s telecommunications terminal 101-1. The second message includes, but is not limited to:
   i. a request that the caller $C_1$ transmit an indicium indicating whether the participant $P_1$ or the participant $P_2$ has successfully assisted the caller $C_1$ during the conference call, or
   ii. a request that the caller $C_1$ participate in the first group to assist future callers, or
   iii. any combination of i and ii.

Task 306 is described in detail below and with respect to FIG. 8.

At task 307, the call-processing switch 106 connects the caller $C_1$ and the other callers indexed in the first group with a call-center agent $A_1$ when:

i. a response to the first message is not received from the participant $P_1$'s telecommunications terminal, and
   ii. a response to the first message is not received from the participant $P_2$'s telecommunications terminal.

Task 307 is described in detail below and with respect to FIG. 9.

Figure 4:
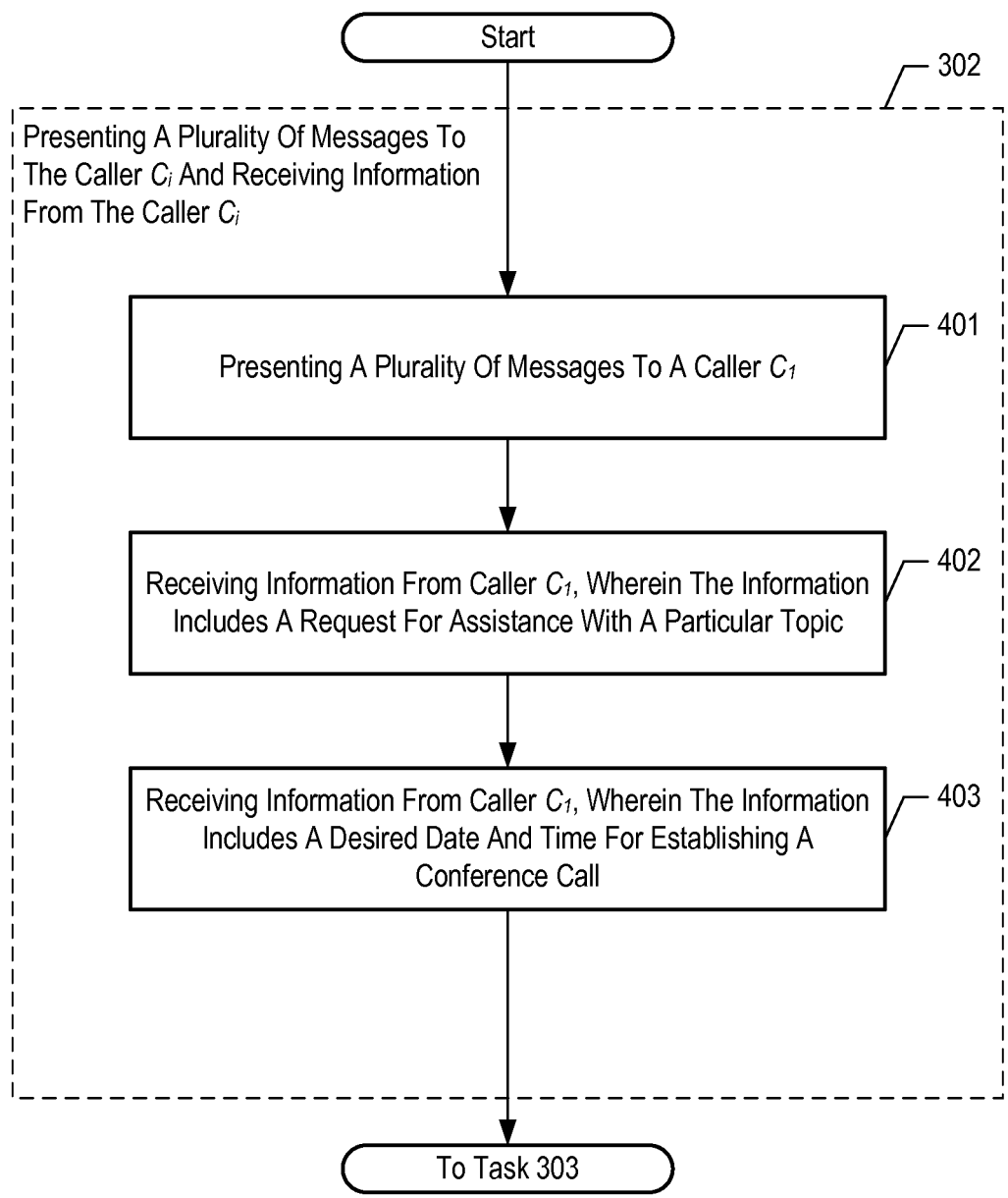
FIG. 4 depicts a flowchart of the salient tasks associated with the operation of task 302 in accordance with the illustrative embodiment of the present invention.

FIG. 4 depicts a flowchart of the salient tasks associated with the operation of task 302 in accordance with the illustrative embodiment of the present invention.

It will be clear to those skilled in the art, after reading this disclosure, how to make and use alternative embodiments of the present invention in which tasks 401, 402, and 403 are performed in a different order or are performed concurrently. Furthermore, it will be clear to those skilled in the art, after reading this disclosure, how to make and use alternative embodiments of the present invention that omit one or more tasks 401, 402, and 403.

At task 401, the call-processing switch 106 is configured to initially present an interactive voice response to the caller $C_1$ upon receiving a call from the caller $C_1$'s telecommunications terminal 101-1.

In accordance with the illustrative embodiment, the interactive voice response initially presents the caller $C_1$ with a first question. An example of the first question presented to the caller $C_1$ might be:
   What type of terminal are you having a problem with?
   i. Please say "cell phone" or press "1" on your keypad, or
   ii. Please say "smart-phone" or press "2" on your keypad, or
   iii. Please say "personal digital assistant" or press "3" on your keypad.

After receiving a first response to the first question from caller $C_1$ via the caller telecommunications terminal 101-1, a second question is presented to the caller $C_1$. An example of the second question presented to the caller $C_1$ might be:
   What feature on your cell phone can I help you with?
   i. Please say "Internet services" or press "1" on your keypad, or
   ii. Please say "short-message-service" or press "2" on your keypad, or
   iii. Please say "ring-tone" or press "3" on your keypad.

In accordance with the illustrative embodiment, the caller $C_1$ is contacting call center 104 to obtain information on:
   i. a cell phone, and
   ii. a ring-tone feature on the cell phone.

For the sake of simplicity, the illustrative embodiment presents a first question and a second question to the caller $C_1$, but it will be clear to those skilled in the art, after reading this disclosure, how to make and use alternative embodiments of the present invention in which one question or a plurality of questions are presented to the caller $C_1$ (e.g., a third question, a fourth question, a fifth question, etc.) to identify a group that is most closely related to the caller $C_1$'s request for obtaining information.

Additionally, it will be clear to those skilled in the art, after reading this disclosure, how to make and use alternative embodiments of the present invention in which the interactive voice response questions could be phrased in one or more alternative forms.

Additionally, it will be clear to those skilled in the art, after reading this disclosure, how to make and use alternative embodiments of the present invention in which the caller $C_1$ contacts call center 104 to obtain information on a different type of product, for example, and without limitation, a laptop, a desktop, a wireline telecommunications terminal, etc., and, based at least in part on the type of product information the caller $C_1$ is trying to obtain, a different interactive voice response is presented to the caller $C_1$.

At task 402, when the caller $C_1$ is presented with the first question, the caller $C_1$ either speaks the phrase "cell phone" or presses "1" on the keypad. In response to the caller $C_1$ speaking the phrase "cell phone" or pressing "1" on the keypad, the call-processing switch 106 collects the first response to the first question from caller $C_1$.

As part of task 402, when the caller $C_1$ is presented with the second question, the caller $C_1$ either speaks the phrase "ring-tone" or presses "3" on the keypad. In response to the caller $C_1$ speaking the phrase "ring-tone" or pressing "3" on the keypad, the call-processing switch 106 collects the second response to the second question from caller $C_1$.

By responding to the first question and the second question, the caller $C_1$ is specifying a request for assistance with a particular topic, which, in this illustrative embodiment, pertains to the topic of cell phones and ring-tones. Therefore, based at least in part on the information received from the caller $C_1$ (i.e., the first response and the second response), the call-processing switch 106 determines that the request for assistance from the caller $C_1$ pertains to the topic of "cell phones" and "ring-tones."

At task 403, when the caller $C_1$ has finished responding to the questions, the caller $C_1$ speaks the phrase "finished" or presses "#" on his keypad. By speaking the phrase "finished" or pressing "#" on his keypad, the call-processing switch 106 detects that the caller $C_1$ has answered all the questions that best matches the topic of caller $C_1$'s problem. At this point, the call-processing switch 106 request that the caller $C_1$ specify a desired date and time to establish a conference call with a participant $P_j$ or an agent $A_k$ so that the participant $P_j$ or the agent $A_k$ could, for example, provide guidance on how to operate or troubleshoot the caller $C_1$'s "cell phone."

In accordance with the illustrative embodiment, the caller $C_1$ specifies that he desires to immediately establish a conference call with a participant $P_j$ or an agent $A_k$ (e.g., within the next few seconds or minutes of responding to the first question and the second question), but it will be clear to those skilled in the art, after reading this disclosure, how to make and use alternative embodiments of the present invention in which the desired date and time specified by the caller $C_1$ for establishing a conference call with a participant $P_j$ or an agent $A_k$ could be, for example, and without limitation, within the next few hours, within the next few days, or within the next few weeks of responding to the interactive voice response questions.

Additionally, it will be clear to those skilled in the art, after reading this disclosure, how to make and use alternative embodiments of the present invention in which the call-processing switch 106 reserves communications resources on the teleconferencing bridge 204 when the caller $C_1$ desires to establish a conference call with a participant $P_j$ or an agent $A_k$ within the next few hours, within the next few days, or within the next few weeks of responding to the questions.

Additionally, it will be clear to those skilled in the art, after reading this disclosure, how to make and use alternative embodiments of the present invention in which different phrases, buttons on the keypad, or sequence of phrases and buttons on the keypad could be used to indicate that the caller $C_1$ has finished responding to the questions.

Figure 5:
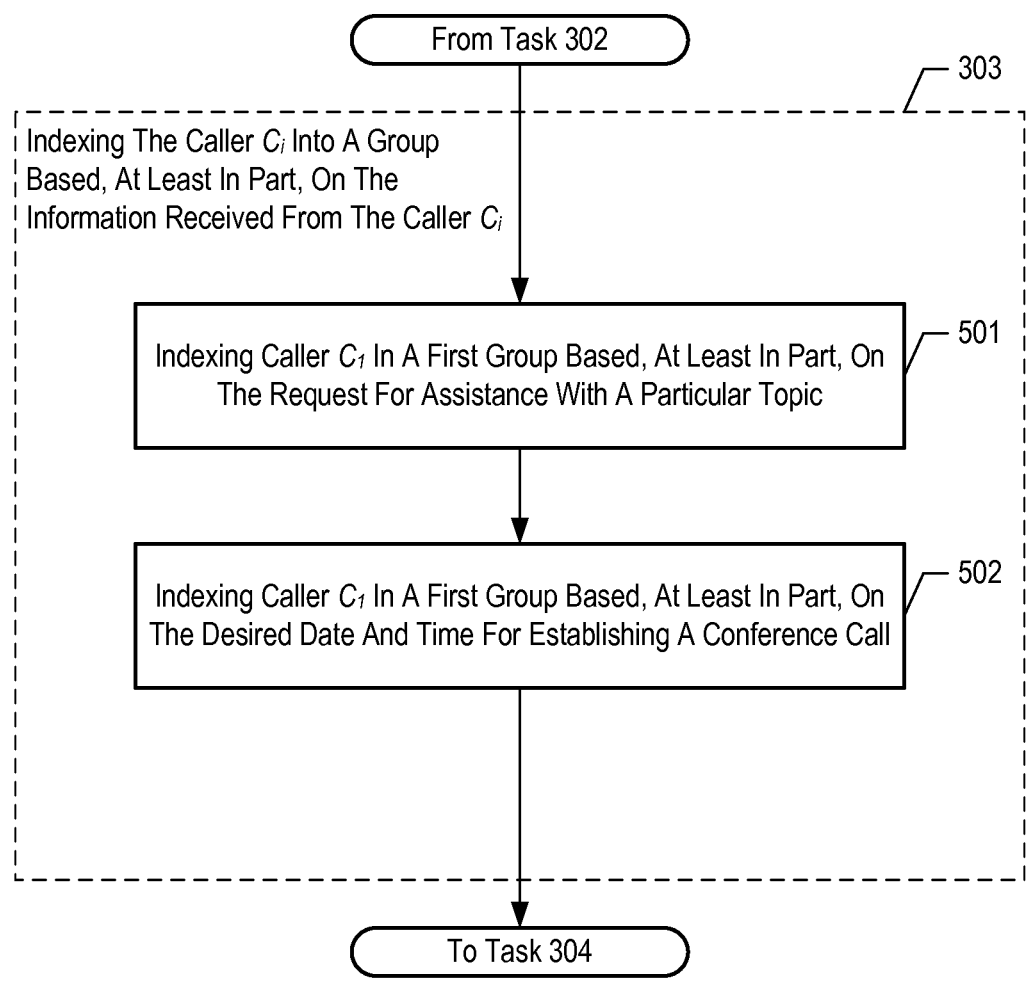
FIG. 5 depicts a flowchart of the salient tasks associated with the operation of task 303 in accordance with the illustrative embodiment of the present invention.

FIG. 5 depicts a flowchart of the salient tasks associated with the operation of task 303 in accordance with the illustrative embodiment of the present invention.

It will be clear to those skilled in the art, after reading this disclosure, how to make and use alternative embodiments of the present invention in which tasks 501 and 502 are performed in a different order or are performed concurrently. Furthermore, it will be clear to those skilled in the art, after reading this disclosure, how to make and use alternative embodiments of the present invention that omit one or more tasks 501 and 502.

At task 501, the call-processing switch 106 indexes the caller $C_1$ in a first group among a plurality of groups based, at least in part, on:
  i. the caller $C_1$'s first response to the first question (i.e., speaking the phrase "cell phone" or pressing "1" on the keypad), and
  ii. the caller $C_1$'s second response to the second question (i.e., speaking the phrase "ring-tone" or pressing "3" on the keypad).

The call-processing switch 106 compares the first response "cell phone" with a plurality of groups. Once the call-processing switch 106 identifies a plurality of groups that match the topic "cell phone," the call-processing switch 106 compares the second response "ring-tone" to the plurality of groups that have been identified. Once a "ring-tone" group is identified, the call-processing switch 106 indexes the caller $C_1$ in the "ring-tone" group (i.e., the first group).

At task 502, the call-processing switch 106 indexes the caller $C_1$ in a first group among a plurality of groups based, at least in part, on the desired date and time specified by the caller $C_1$ for establishing a conference call with a participant $P_j$ or an agent $A_k$.

For example, if two "ring-tone" groups are identified by the call-processing switch 106 during task 501, the call-processing switch 106 will compare the caller $C_1$'s desired date and time with a temporal criterion of the first group and the second group.

If the caller $C_1$'s desired date and time satisfies the temporal criterion of the first group, the caller $C_1$ is indexed in the first group. On the other hand, if the caller $C_1$'s desired date and time does not satisfy the temporal criterion of the first group, the call-processing switch 106 compares the caller $C_1$'s desired date and time with the temporal criterion of the second group. If the caller $C_1$'s desired date and time satisfies the temporal criterion of the second group, the caller $C_1$ is indexed in the second group.

In accordance with the illustrative embodiment, once the caller $C_1$ is indexed in the first group, a message is transmitted from the call-processing switch 106 to a participant $P_j$'s telecommunications terminal 102-j. Upon receiving a response to the message at the call-processing switch 106, a conference call is immediately established between the participant $P_j$, the caller $C_1$, and the other callers indexed in the first group, which will be described in detail below and with respect to the task of FIG. 6.

It will be clear to those skilled in the art, after reading this disclosure, how to make and use alternative embodiments of the present invention in which the call-processing switch 106 places the caller $C_1$ in a queue after being indexed in the first group. Once the caller $C_1$ is placed in the queue, the caller $C_1$ waits for either:
  i. a call-center agent $A_k$ to be available to establish a conference call with the caller $C_1$ and any other callers indexed in the first group, or
  ii. a participant $P_j$ to respond to the first message, and whoever has the earliest availability will assist the caller $C_1$ and the other callers indexed in the first group.

This is advantageous because the caller $C_1$ can establish a conference call with a participant $P_j$ to obtain useful information regarding his product (i.e., the "ring-tone" feature on his "cell phone") while maintaining his place in the queue until a call-center agent $A_k$ is available. In this alternative embodiment, when a conference call is established between a participant $P_j$ and the caller $C_1$ indexed in the first group, the caller $C_1$ does not lose his place in the queue, and, therefore, does not need to contact the call-center 104 again to speak with a call-center agent $A_k$. Instead the caller $C_1$ can obtain useful information from the participant $P_j$ while maintaining his place in the queue until a call-center agent $A_k$ is available to assist the caller $C_1$.

Additionally, it will be clear to those skilled in the art, after reading this disclosure, how to make and use alternative embodiments of the present invention in which the caller $C_1$ can immediately establish a conference call with a participant $P_1$ after being indexed in the first group rather than waiting in the queue for a call-center agent $A_k$, which will be described in detail below and with respect to task 601 through 606.

Additionally, it will be clear to those skilled in the art, after reading this disclosure, how to make and use alternative embodiments of the present invention in which the call-processing switch 106 performs, for example, and without limitation, a third comparison, a fourth comparison, a fifth comparison, etc. based, at least in part, on the number of responses received from the caller $C_1$.

Additionally, it will be clear to those skilled in the art, after reading this disclosure, how to make and use alternative embodiments of the present invention in which the group that the caller $C_1$ is indexed in may include the caller $C_1$ himself or other callers (e.g., caller $C_2$, caller $C_3$, caller $C_4$, etc.)

Additionally, it will be clear to those skilled in the art, after reading this disclosure, how to make and use alternative embodiments of the present invention in which the groups are defined by, for example, and without limitation, the call-processing switch 106, a call-center agent, a call-center administrator, etc.

Figure 6:
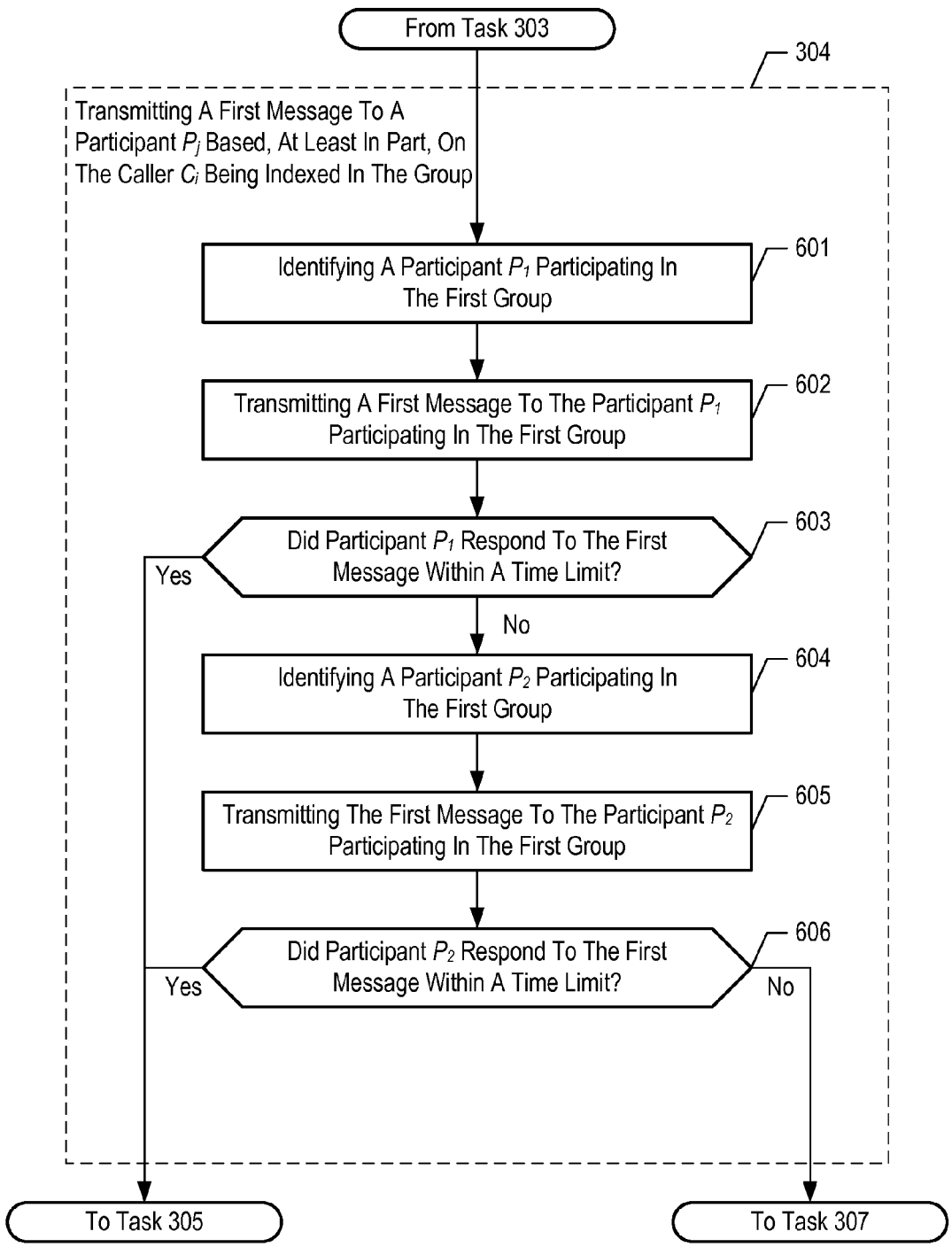
FIG. 6 depicts a flowchart of the salient tasks associated with the operation of task 304 in accordance with the illustrative embodiment of the present invention.

FIG. 6 depicts a flowchart of the salient tasks associated with the operation of task 304 in accordance with the illustrative embodiment of the present invention.

It will be clear to those skilled in the art, after reading this disclosure, how to make and use alternative embodiments of the present invention in which tasks 601, 602, 603, 604, 605, and 606 are performed in a different order or are performed concurrently. Furthermore, it will be clear to those skilled in the art, after reading this disclosure, how to make and use alternative embodiments of the present invention that omit one or more tasks 601, 602, 603, 604, 605, and 606.

At task 601, call-processing switch 106 identifies a participant $P_j$ that has agreed to assist one or more callers indexed in the first group. The call-processing switch 106 identifies that participant $P_1$ has agreed to assist the callers indexed in the first group based, at least in part, on a list of participants associated with the first group. This list of participants associated with the first group is compiled, for example when a participant $P_1$ transmits a message to the call-processing switch 106 indicating that:

i. he has agreed to assist callers indexed in the first group, and
ii. he is available to assist callers indexed in the first group on Monday, Wednesday, and Friday from 9 a.m. to 1 p.m., and when a participant $P_2$ transmits a message to the call-processing switch 106 indicating that:

i. she has agreed to assist callers indexed in the first group, and
ii. she is available to assist callers indexed in the first group on Monday, Wednesday, and Friday from 10 a.m. to 2 p.m.

In accordance with the illustrative embodiment, participant $P_1$ and participant $P_2$ were callers previously indexed in the first group, and, because participant $P_1$ and participant $P_2$ were successfully assisted by a call-center agent in the past, participant $P_1$ and participant $P_2$ have the knowledge to assist other callers indexed in the first group.

It will be clear to those skilled in the art, after reading this disclosure, how to make and use alternative embodiments of the present invention in which participant $P_1$ and participant $P_2$ were not previously indexed in the first group. Instead, participant $P_1$ and participant $P_2$ are customers of an enterprise, and, by participating in the first group to assist one or more callers, participant $P_1$ and participant $P_2$ are able to receive a benefit from the enterprise or the call-center 104. The benefit may comprise, for example, and without limitation:

i. a discount applied to a purchase made by the participant, or
ii. applying a micro-payment to an account associated with the participant $P_1$,
iii. a discount applied to an invoice associated with the participant's telecommunications terminal that responded to the first message, or
iv. any combination of i, ii, and iii.

It will be clear to those skilled in the art, after reading this disclosure, how to make and use alternative embodiments of the present invention in which the incentive for the participants to assist a caller indexed in a group may comprises other types of benefits Additionally, it will be clear to those skilled in the art, after reading this disclosure, how to make and use alternative embodiments of the present invention in which the participant $P_1$ and the participant $P_2$ are participants of more than one group (e.g., a second group, a third group, a fourth group, etc.)

At task 602, the call-processing switch 106 transmits a first message to the participant $P_1$'s telecommunications terminal 102-1. The first message is requesting that the participant $P_1$ assist the caller $C_1$ and the other callers indexed in the first group at the desired date and time that was specified by the caller $C_1$ and the other callers indexed in the first group.

In accordance with the illustrative embodiment, the call-processing switch 106 transmits the first message to participant $P_1$'s telecommunications terminal 102-1 upon identifying that participant $P_1$ has agreed to assist the callers indexed in the first group, but it will be clear to those skilled in the art, after reading this disclosure, how to make and use alternative embodiments of the present invention in which the call-processing switch 106 also transmits the first message to participant $P_1$'s telecommunications terminal 102-1 based, at least in part, on presence information of participant $P_1$'s telecommunications terminal 102-1.

For example, the call-processing switch 106 transmits the first message to participant $P_1$'s telecommunications terminal 102-1 based, at least in part, on the presence information indicating that:

i. the participant $P_1$'s telecommunications terminal 102-1 is powered-on, or
ii. the participant $P_1$'s telecommunications terminal 102-1 is not currently in a call, or
iii. the participant $P_1$'s telecommunications terminal 102-1 has accessed a web page a few second or a few minutes of being identified as a participant of the first group, or
iv. the participant $P_1$'s telecommunications terminal 102-1 has transmitted an instant message a few second or a few minutes of being identified as a participant of the first group, or
v. the participant $P_1$'s telecommunications terminal 102-1 has transmitted an e-mail a few second or a few minutes of being identified as a participant of the first group, or vi. the participant $P_1$'s telecommunications terminal 102-1 has transmitted a short-message service a few second or a few minutes of being identified as a participant of the first group, or vii. any combination of i, ii, iii, iv, v, and vi.

At task 603, the call-processing switch 106 determines whether a response to the first message is received from the participant $P_1$'s telecommunications terminal 102-1 within a time limit.

In accordance with the illustrative embodiment, the time limit is ten seconds, but it will be clear to those skilled in the art, after reading this disclosure, how to make and use alternative embodiments of the present invention in which the time limit is less than ten seconds (e.g., nine seconds, seven seconds, five seconds, etc.) or greater than ten seconds (e.g., eleven seconds, fifteen seconds, one minute, one hour, one day, etc.) based, at least in part, on the caller $C_1$'s desired date and time to establish a conference call at task 502.

As part of task 603, when a response to the first message is received from the participant $P_1$'s telecommunications terminal 102-1 within the time limit (i.e., on or before ten seconds), and, the response indicates that the participant $P_1$ is available to establish a conference call, the flow moves to task 305 to establish a conference call between the participant $P_1$, the caller $C_1$, and the other callers indexed in the first group.

On the other hand, when a response is not received from the participant $P_1$'s telecommunications terminal 102-1 within the time limit, or, a response from the participant $P_1$'s telecommunications terminal 102-1 indicates that the participant $P_1$ is not available to establish a conference call with the caller $C_1$ and the other callers indexed in the first group, the flow moves to task 604 to identify a participant $P_2$ from the list associated with the first group.

At task 604, when a response to the first message is not received from participant $P_1$'s telecommunications terminal 102-1, the call-processing switch 106 identifies a participant $P_2$ from the list of participants associated with the first group in the same or similar fashion as previously described in task 601.

In other words, upon identifying that the participant $P_2$ has agreed to assist the callers indexed the first group, the call-processing switch 106 transmits the first message to the participant $P_2$'s telecommunications terminal 102-2, but it will be clear to those skilled in the art, after reading this disclosure, how to make and use alternative embodiments of the present invention in which the call-processing switch 106 also transmits the first message to participant $P_2$'s telecommunications terminal 102-2 based, at least in part, on presence information of participant $P_2$'s telecommunications terminal 102-2.

For example, the call-processing switch 106 transmits the first message to the participant $P_2$'s telecommunications terminal 102-1 based, at least in part, on the presence information of participant $P_2$'s telecommunications terminal 102-2 indicating that:

i. the participant $P_1$'s telecommunications terminal 102-1 is powered-on, or ii. the participant $P_1$'s telecommunications terminal 102-1 is not currently in a call, or iii. the participant $P_1$'s telecommunications terminal 102-1 has accessed a web page a few second or a few minutes of being identified as a participant of the first group, or iv. the participant $P_1$'s telecommunications terminal 102-1 has transmitted an instant message a few second or a few minutes of being identified as a participant of the first group, or v. the participant $P_1$'s telecommunications terminal 102-1 has transmitted an e-mail a few second or a few minutes of being identified as a participant of the first group, or vi. the participant $P_1$'s telecommunications terminal 102-1 has transmitted a short-message service a few second or a few minutes of being identified as a participant of the first group, or vii. any combination of i, ii, iii, iv, v, and vi.

At task 605, the call-processing switch 106 transmits the first message to the participant $P_2$'s telecommunications terminal 102-2. The first message is requesting that participant $P_2$ assist the caller $C_1$ and the other callers indexed in the first group at the desired date and time that was specified by the caller $C_1$ and the other callers indexed in the first group.

At task 606, the call-processing switch 106 determines whether a response to the first message is received from the participant $P_2$'s telecommunications terminal 102-2 within a time limit in the same or similar fashion as task 603.

In other words, if a response to the first message is received from the participant $P_2$'s telecommunications terminal 102-2 within the time limit (i.e., on or before ten seconds), and, the response indicates that the participant $P_2$ is available to establish a conference call, the call-processing switch 106 establishes a conference call between the participant $P_2$, the caller $C_1$, and the other callers indexed in the first group.

On the other hand, if a response is not received from the participant $P_2$'s telecommunications terminal 102-2 within the time limit, or, a response from the participant $P_2$'s telecommunications terminal 102-2 indicates that the participant $P_2$ is not available to establish a conference call with the caller $C_1$ and the other callers indexed in the first group, the flow moves to task 307, which will be described in detail below with respect to FIG. 9.

It will be clear to those skilled in the art, after reading this disclosure, how to make and use alternative embodiments of the present invention in which the first message is transmitted to more than two participants (e.g., participant $P_3$, participant $P_4$, participant $P_5$, etc.) in the list when participant $P_1$ and participant $P_2$ do not respond to the first message.

Additionally, it will be clear to those skilled in the art, after reading this disclosure, how to make and use alternative embodiments of the present invention in which the first message is transmitted to participant $P_1$ and participant $P_2$ at the same time, and, whoever responds to the first message will establish a conference call with the caller $C_1$ and the other callers indexed in the first group.

Figure 7:
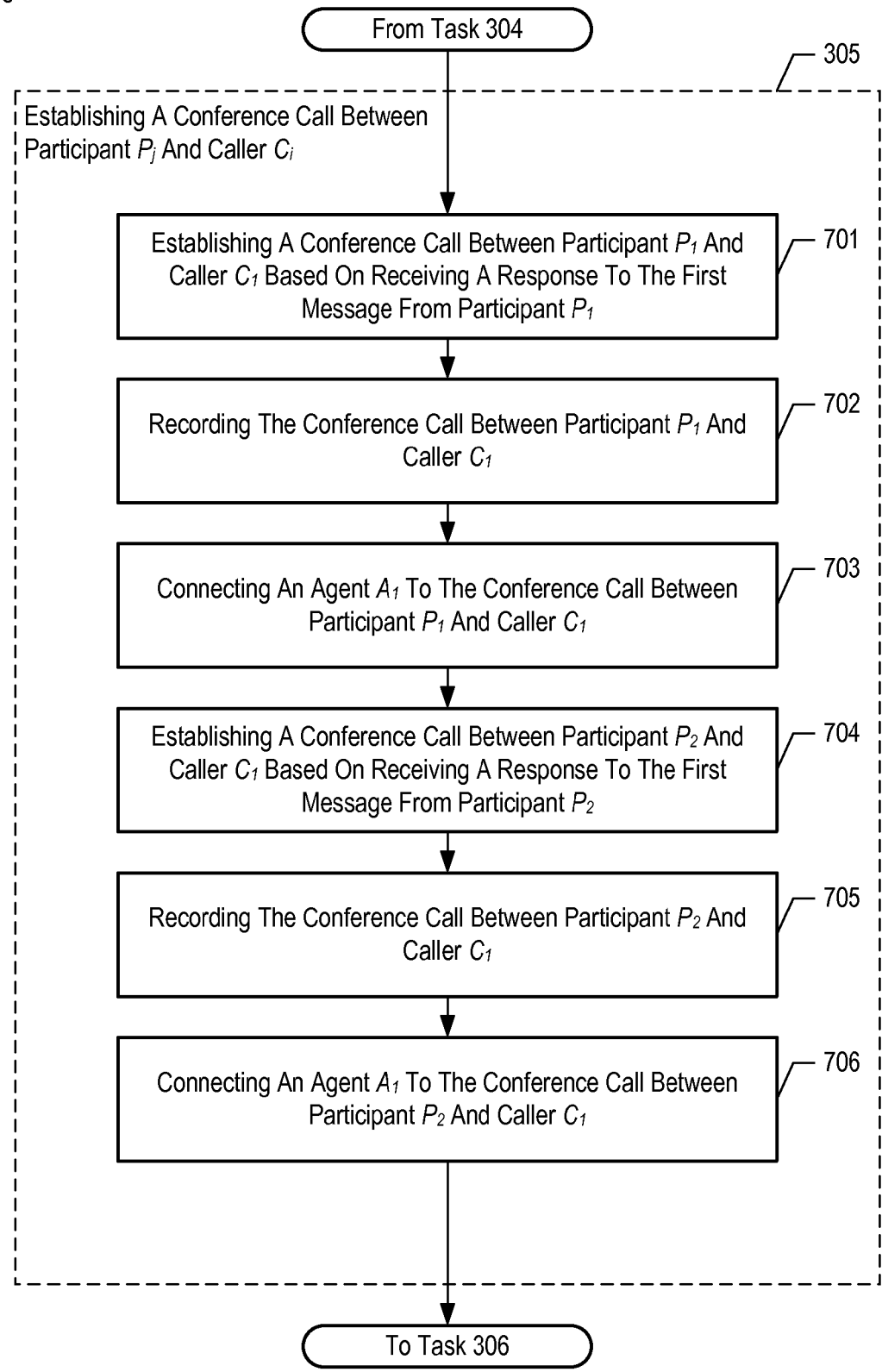
FIG. 7 depicts a flowchart of the salient tasks associated with the operation of task 305 in accordance with the illustrative embodiment of the present invention.

FIG. 7 depicts a flowchart of the salient tasks associated with the operation of task 305 in accordance with the illustrative embodiment of the present invention.

It will be clear to those skilled in the art, after reading this disclosure, how to make and use alternative embodiments of the present invention in which tasks 701, 702, 703, 704, 705, and 706 are performed in a different order or are performed concurrently. Furthermore, it will be clear to those skilled in the art, after reading this disclosure, how to make and use alternative embodiments of the present invention that omit one or more tasks 701, 702, 703, 704, 705, and 706.

At task 701, the call-processing switch 106 establishes a conference call between the participant $P_1$, the caller $C_1$, and the other callers indexed in the first group based, at least in part, on receiving a response to the first message from the participant $P_1$'s telecommunications terminal 102-1 within the time limit (i.e., the participant $P_1$ has indicated that he is available to assist the caller $C_1$ and the other callers indexed in the first group).

Once the conference call is established between the participant $P_1$, caller $C_1$, and the other callers indexed in the first group, the participant $P_1$ can assist the caller $C_1$ and the other callers indexed in the first group by, for example, and without limitation, answering one or more questions from the caller $C_1$ and the other callers indexed in the first group. Therefore, once the conference call is established, the participant $P_1$ can interact with the caller $C_1$ and the other callers indexed in the first group to provide the caller $C_1$ and the other callers indexed in the first group with information they desire to obtain without being connected with a call-center agent $A_k$.

It will be clear to those skilled in the art, after reading this disclosure, how to make and use alternative embodiments of the present invention in which the conference call established between the participant $P_1$, the caller $C_1$, and the other callers indexed in the first group is an in-progress conference call.

In other words, the participant $P_1$ is currently assisting other callers when the first message is transmitted to the participant $P_1$'s telecommunications terminal 102-1. Since the topic of the in-progress conference call is similar to the topic of first group, the participant $P_1$ can transmit a response to the first message via the participant $P_1$'s telecommunications terminal 102-1, which indicates, for example, and without limitation:

i. that the participant $P_1$ can assist the callers of the in-progress conference call and the caller $C_1$ indexed in the first group at the same time (i.e., the participant $P_1$ will not be overwhelmed by combining the in-progress conference call with the callers indexed in the first group), or ii. that the participant $P_1$ cannot assist the caller $C_1$ indexed in the first group while assisting the callers of the in-progress conference call (i.e., the participant $P_1$ will be overwhelmed by combining the in-progress conference call with the caller indexed in the first group).

In accordance with the illustrative embodiment, the participant $P_1$ is given administrative privileges of the conference call. The administrative privileges include, but are not limited to:

i. muting a caller in the conference call, or ii. disconnecting a caller from the conference call, or iii. connecting a caller to the conference call with the caller $C_1$ and the other callers indexed in the first group, or iv. transmitting a message to an agent $A_k$, or v. transmitting a message to a caller $C_i$ in the conference call, or vi. any combination of i, ii, iii, iv, v.

At task 702, when the conference call is established, the call-processing switch 106 begins to record the conference call between the participant $P_1$, the caller $C_1$, and the other callers. By recording and storing the conference call in memory 203, future callers that are indexed in the first group could access and listen to the recorded conference call. This is advantageous because future callers can resolve their cell phone problems without having to establish a conference call with a participant $P_j$ or an agent $A_k$, thus, reducing the call-center 104's need to hire additional call-center agents.

In accordance with the illustrative embodiment, the conference call is recorded and stored in memory 203 associated with the call-processing switch 106, but it will be clear to those skilled in the art, after reading this disclosure, how to make and use alternative embodiments of the present invention in which the recorded conference call is stored in a memory or a server that is co-located or not co-located with the call-processing switch 106.

Additionally, it will be clear to those skilled in the art, after reading this disclosure, how to make and use alternative embodiments of the present invention in which future callers could access and listen to more than one recorded conference call that is related or unrelated to the topic of the first group.

At task 703, the call-processing switch 106 receives a signal from agent $A_1$'s telecommunications terminal 105-1 to connect to the conference call between the participant $P_1$, the caller $C_1$, and the other callers indexed in the first group. When the agent $A_1$ connects to the conference call, the agent $A_1$ can evaluate the quality-of-service of participant $P_1$.

In accordance with the illustrative embodiment, agent $A_1$ can increment a counter associated with the participant $P_1$ based on the quality-of-service of participant $P_1$. This counter associated with the participant $P_1$ is for:

i. applying a discount to a purchase made by the participant $P_1$, or ii. applying a discount to an invoice associated with the participant $P_1$'s telecommunications terminal 101-1 that responded to the first message, or iii. any combination of i and ii.

On the other hand, if the participant $P_1$ does not satisfy the quality-of-service standards of the call-center 104, the counter is decremented so that participant $P_1$ does not receive any benefits. Thus, the counter is a means for:

i. ensuring that the quality-of-service standards of the call-center 104 is satisfied, and ii. providing an incentive for the participant to assist callers with their problems.

Additionally, in accordance with the illustrative embodiment, the participant $P_1$, the caller $C_1$, and the other callers in the conference call are not aware of the fact that the agent $A_1$ has connected to the conference call, but it will be clear to those skilled in the art, after reading this disclosure, how to make and use alternative embodiments of the present invention in which a sound or an announcement is transmitted to the participant $P_1$, the caller $C_1$, and the other callers when the agent $A_1$ connects to the conference call.

At task 704, if a response to the first message is not received from the participant $P_1$'s telecommunications terminal 102-1, or, the participant $P_1$ has indicated that he is unavailable to assist the callers indexed in the first group, a conference call is established between the participant $P_2$, the caller $C_1$, and the other callers indexed in the first group based, at least in part, on receiving a response to the first message from participant $P_2$'s telecommunications terminal 102-1 within the time limit (i.e., the participant $P_2$ has indicated that she is available to assist the caller $C_1$ and the other callers). Once a conference call is established, the participant $P_2$ can assist the caller $C_1$ and other callers in the conference call with their ring-tone feature on their cell phone.

Once the conference call is established between the participant $P_2$, caller $C_1$, and the other callers indexed in the first group, the participant $P_2$ can assist the caller $C_1$ and the other callers indexed in the first group by, for example, and without limitation, answering one or more questions from the caller $C_1$ and the other callers indexed in the first group. Therefore, the participant $P_2$ can interact with the caller $C_1$ and the other callers indexed in the first group to provide the caller $C_1$ and the other callers indexed in the first group with information they desire to obtain without being connected with a call-center agent $A_k$.

It will be clear to those skilled in the art, after reading this disclosure, how to make and use alternative embodiments of the present invention in which the conference call established between the participant $P_2$, the caller $C_1$, and the other callers indexed in the first group is an in-progress conference call.

In other words, the participant $P_2$ is currently assisting other callers when the first message is transmitted to the participant $P_2$'s telecommunications terminal 102-2. Since the topic of the in-progress conference call is similar to the topic of first group, the participant $P_2$ can transmit a response to the first message via the participant $P_1$'s telecommunications terminal 102-1, which indicates, for example, and without limitation:
  i. that the participant $P_2$ can assist the callers of the in-progress conference call and the caller $C_1$ indexed in the first group at the same time (i.e., the participant $P_2$ will not be overwhelmed by combining the in-progress conference call with the callers indexed in the first group), or
  ii. that the participant $P_2$ cannot assist the caller $C_1$ indexed in the first group while assisting the callers of the in-progress conference call (i.e., the participant $P_2$ will be overwhelmed by combining the in-progress conference call with the caller indexed in the first group).

In accordance with the illustrative embodiment, the participant $P_2$ is given administrative privileges of the conference call. The administrative privileges include, but are not limited to:
  i. muting a caller in the conference call, or
  ii. disconnecting a caller from the conference call, or
  iii. connecting a caller to the conference call with caller $C_1$ and the other callers indexed in the first group, or
  iv. transmitting a message to an agent $A_k$ associated with the call-center, or
  v. transmitting a message to a caller $C_i$ in the conference call, or
  vi. any combination of i, ii, iii, iv, v.

At task 705, when the conference call is established, the call-processing switch 106 begins to record the conference call between the participant $P_2$, the caller $C_1$, and the other callers in the same or similar fashion as described in task 701.

At task 706, the call-processing switch 106 receives a signal from agent $A_1$'s telecommunications terminal 105-1 to connect to the conference call between the participant $P_2$, the caller $C_1$, and the other callers indexed in the first group. When the agent $A_1$ connects to the conference call, the agent $A_1$ can evaluate the quality-of-service of participant $P_2$ and increment or decrement a counter associated with the participant $P_2$ in the same or similar fashion as described in task 703.

Figure 8:
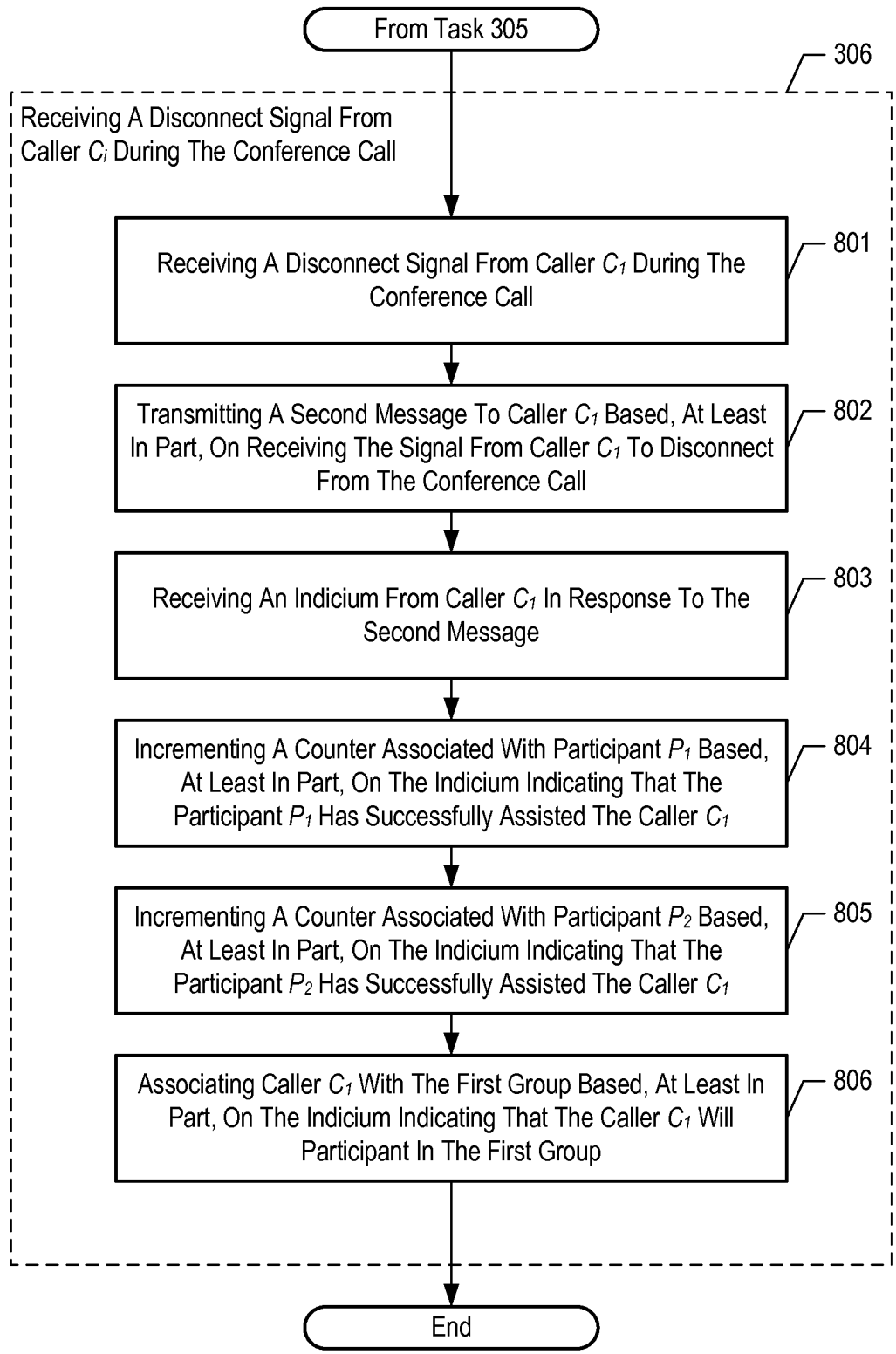
FIG. 8 depicts a flowchart of the salient tasks associated with the operation of task 306 in accordance with the illustrative embodiment of the present invention.

FIG. 8 depicts a flowchart of the salient tasks associated with the operation of task 306 in accordance with the illustrative embodiment of the present invention.

It will be clear to those skilled in the art, after reading this disclosure, how to make and use alternative embodiments of the present invention in which tasks 801, 802, 803, 804, 805, and 806 are performed in a different order or are performed concurrently. Furthermore, it will be clear to those skilled in the art, after reading this disclosure, how to make and use alternative embodiments of the present invention that omit one or more tasks 801, 802, 803, 804, 805, and 806.

At task 801, the call-processing switch 106 detects that the caller $C_1$'s telecommunications terminal 101-1 has disconnected from the conference call with participant $P_1$ or participant $P_2$.

At task 802, the call-processing switch 106 transmits a second message to the caller $C_1$'s telecommunications terminal 101-1 based, at least in part, on detecting that the caller $C_1$'s telecommunications terminal 101-1 has disconnected from the conference call. The second message includes, but is not limited to:
  i. a request that the caller $C_1$ transmit an indicium indicating whether the participant $P_1$ or the participant $P_2$ has successfully assisted the caller $C_1$ during the conference call, or
  ii. a request that the caller $C_1$ participate in the first group to assist future callers, or
  iii. any combination of i and ii.

At task 803, the call-processing switch 106 receives an indicium from the caller $C_1$'s telecommunications terminal 101-1 in response to the second message. The indicium indicates that:
  i. the participant $P_1$ or the participant $P_2$ has successfully assisted the caller $C_1$ during the conference call, or
  ii. the participant $P_1$ or the participant $P_2$ has not successfully assisted the caller $C_1$ during the conference call, or
  iii. the caller $C_1$ would like to participate in the first group to assist future callers indexed in the first group, or
  iv. the caller $C_1$ would not like to participate in the first group to assist future callers indexed in the first group.

At task 804, if the caller $C_1$ was in a conference call with the participant $P_1$, the call-processing switch 106 increments a counter associated with the participant $P_1$ based, at least in part, on caller $C_1$'s indicium indicating that the participant $P_1$ has successfully assisted the caller $C_1$ during the conference call.

In accordance with the illustrative embodiment, this counter associated with the participant $P_1$ is an incentive for the participant $P_1$ to assist callers indexed in a group. In other words, the counter can be used to apply a discount to a purchase made by the participant $P_1$.

It will be clear to those skilled in the art, after reading this disclosure, how to make and use alternative embodiments of the present invention in which the incentive for participants to assist callers indexed in a group may comprise other types of benefits, for example, and without limitation:
  i. applying a micro-payment to an account associated with the participant $P_1$, or
  ii. applying a discount to an invoice associated with the participant $P_1$'s telecommunications terminal 101-1 that responded to the first message, or
  iii. a combination of i and ii.

At task 805, if the caller $C_1$ was in a conference call with the participant $P_2$, the call-processing switch 106 increments a counter associated with the participant $P_2$ based, at least in part, on caller $C_1$'s indicium indicating that the participant $P_2$ has successfully assisted the caller $C_1$ during the conference call. This counter associated with the participant $P_2$ is for:
  i. applying a discount to a purchase made by the participant $P_2$, or
  ii. applying a discount to an invoice associated with the participant $P_2$'s telecommunications terminal 101-2 that responded to the first message, or
  iii. any combination of i and ii.
but it will be clear to those skilled in the art, after reading this disclosure, how to make and use alternative embodiments of the present invention in which the incentive for participants to assist callers indexed in a group comprises other types of benefits.

At task 806, the call-processing switch 106 associates the caller $C_1$'s telecommunications terminal 101-1 with the first group based, at least in part, on caller $C_1$'s indicium indicating that the caller $C_1$ has agreed to participate in the first group to assist future callers.

In accordance with the illustrative embodiment, when the caller $C_1$ has agreed to assist future callers indexed in the first group, the call-processing switch 106 associates the telephone number of caller $C_1$'s telecommunications terminal 101-1 with the first group. Thus, when a future caller is indexed in the first group by the call-processing switch 106, the call-processing switch 106 transmits a message to the caller $C_1$'s telecommunications terminal 101-1 requesting that the caller $C_1$ assist the future callers indexed in the first group in the same or similar fashion as previously described above.

Figure 9:
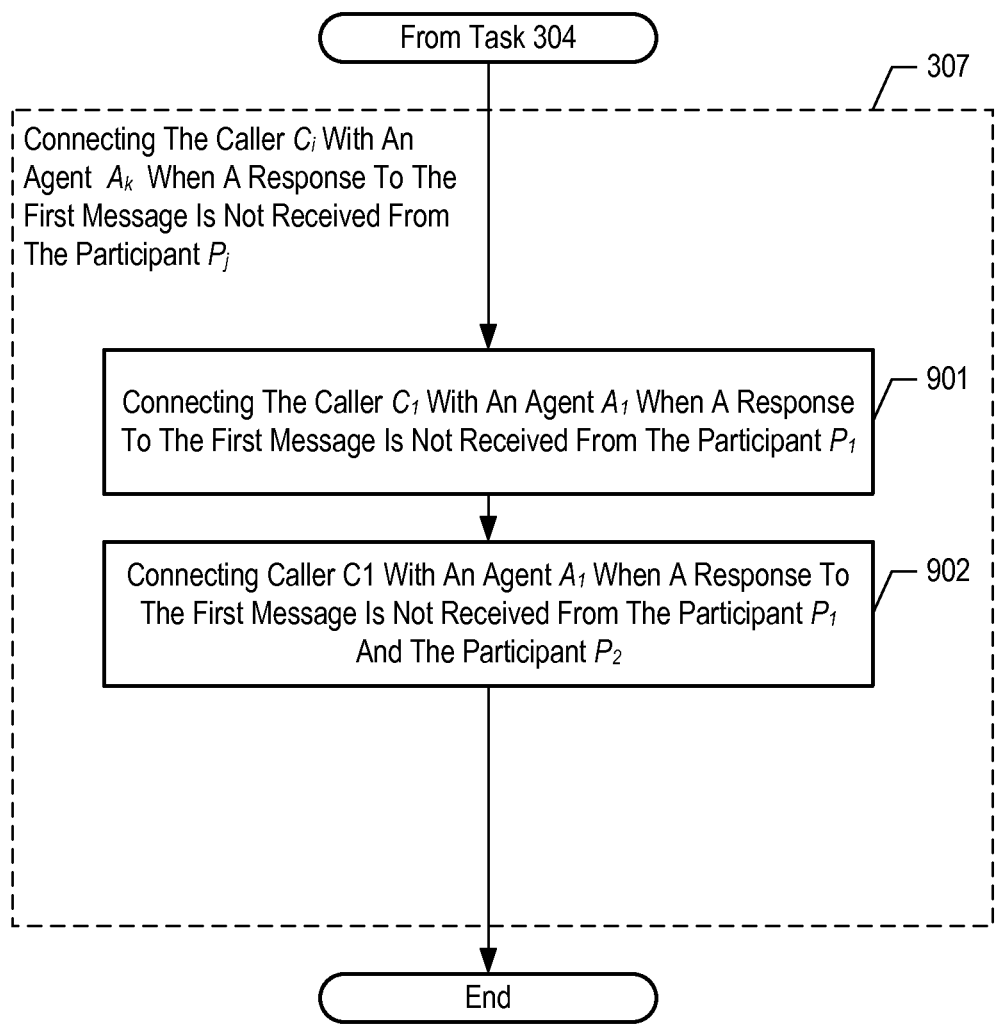
FIG. 9 depicts a flowchart of the salient tasks associated with the operation of task 307 in accordance with the illustrative embodiment of the present invention.

FIG. 9 depicts a flowchart of the salient tasks associated with the operation of task 307 in accordance with the illustrative embodiment of the present invention.

It will be clear to those skilled in the art, after reading this disclosure, how to make and use alternative embodiments of the present invention in which tasks 901 and 902 are performed in a different order or are performed concurrently. Furthermore, it will be clear to those skilled in the art, after reading this disclosure, how to make and use alternative embodiments of the present invention that omit one or more tasks 901 and 902.

At task 901, the call-processing switch 106 connects the caller $C_1$ and the other callers indexed in the first group with an agent $A_1$ if a response to the first message is not received from the participant $P_1$'s telecommunications terminal.

At task 902, the call-processing switch 106 connects the caller $C_1$ and the other callers indexed in the first group with an agent $A_1$ if:
  i. a response to the first message is not received from the participant $P_1$'s telecommunications terminal, and
  ii. a response to the first message is not received from the participant $P_2$'s telecommunications terminal.

In accordance with the illustrative embodiment, the call-processing switch 106 transmits the first message to the participant $P_1$ and the participant $P_2$, and, if a response to the first message is not received from the participant $P_1$ and the participant $P_2$, the call-processing switch 106 connects the caller $C_1$ and the other callers indexed in the first group with a call-center agent $A_1$.

It will be clear to those skilled in the art, after reading this disclosure, how to make and use alternative embodiments of the present invention in which the call-processing switch 106 only transmits the first message to the participant $P_1$, and, if a response to the first message is not received from the participant $P_1$, the call-processing switch 106 connects the caller $C_1$ and the other callers indexed in the first group with the call-center agent $A_1$.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving information from a caller $C_1$;
indexing the caller $C_1$ into a first group based, at least in part, on the information received from the caller $C_1$;
transmitting to a participant $P_1$, a first message requesting that the participant $P_1$ assist the caller $C_1$ indexed in the first group, wherein the first message is transmitted to the participant $P_1$ based, at least in part, on identifying that the participant $P_1$ is a participant of the first group;
establishing a conference call between the participant $P_1$ and the caller $C_1$ in response to the participant $P_1$ responding to the first message; and
connecting the caller $C_1$ with an agent $A_1$ when a response to the first message is not received from the participant $P_1$.

2. The method of claim 1, wherein the information received from the caller $C_1$ comprises a request for assistance with a particular topic; and
wherein the caller $C_1$ is indexed in the first group based, at least in part, on the request for assistance with the particular topic from caller $C_1$ at least partly matching a topic of the first group.

3. The method of claim 1, wherein the information received from the caller $C_1$ comprises a date and time to establish a conference call with at least one of the participant $P_1$ and the agent $A_1$; and
wherein the caller $C_1$ is indexed in the first group based, at least in part, on the date and time from caller $C_1$ satisfying a temporal criterion of the first group.

4. The method of claim 1 further comprising:
transmitting the first message to a participant $P_2$ when the participant $P_1$ does not respond to the first message within a time limit; and
establishing a conference call between the participant $P_2$ and the caller $C_1$ in response to the participant $P_2$ responding to the first message.

5. The method of claim 4, wherein the caller $C_1$ is connected with the agent $A_1$ when the response to the first message is not received from the participant $P_1$ and the participant $P_2$.

6. The method of claim 1, wherein the caller $C_1$ is indexed in the first group with other callers; and
wherein the conference call is established between the participant $P_1$, the caller $C_1$, and the other callers based, at least in part, on receiving the response to the first message from the participant $P_1$.

7. The method of claim 1 further comprising:
transmitting a second message to the caller $C_1$ in response to the caller $C_1$ disconnecting from the conference call with the participant $P_1$;
wherein the second message request that the caller $C_1$ transmit an indicium that indicates whether the participant $P_1$ has successfully assisted the caller $C_1$ during the conference call.

8. The method of claim 7 further comprising:
incrementing a counter associated with the participant $P_1$ based, at least in part, on the indicium indicating that the participant $P_1$ has successfully assisted the caller $C_1$.

9. The method of claim 8 further comprising:
compensating the participant $P_1$ based, at least in part, on the counter;
wherein compensating the participant $P_1$ comprises at least one of:
  applying a discount to an invoice associated with the participant $P_1$'s telecommunications terminal that responded to the first message, and
  applying a discount to a purchase made by the participant $P_1$.

10. The method of claim 1 further comprising:
transmitting a second message to the caller $C_1$ in response to the caller $C_1$ disconnecting from the conference call with the participant $P_1$;
wherein the second message request that the caller $C_1$ participate in the first group to assist a caller $C_2$ indexed in the first group.

11. The method of claim 10 further comprising:
receiving from the caller $C_1$, an indicium that the caller $C_1$ will participate in the first group;
associating a telephone number of caller $C_1$'s telecommunications terminal with the first group; and
transmitting a third message to the caller $C_1$ requesting that the caller $C_1$ assist the caller $C_2$ indexed in the first group.

12. The method of claim 11 further comprising:
incrementing a counter associated with the caller $C_1$'s telecommunications terminal based, at least in part, on receiving a signal from the caller $C_2$ indexed in the first group; and compensating the caller $C_1$ based, at least in part, on the counter, wherein compensating the caller $C_1$ comprises:
applying a discount to an invoice associated with the caller $C_1$'s telecommunications terminal, and
applying a discount to a purchase made by the caller $C_1$.

13. The method of claim 1 further comprising:
authorizing the agent $A_1$ to connect to the conference call between the participant $P_1$ and the caller $C_1$;
receiving a signal from agent $A_1$'s telecommunications terminal, wherein the signal is indicative of participant $P_1$'s quality-of-service during the conference call between the participant $P_1$ and the caller $C_1$; and
incrementing a counter associated with the participant $P_1$ based, at least in part, on receiving the signal from the agent $A_1$'s telecommunications terminal.

14. The method of claim 1 further comprising:
recording the conference call between the participant $P_1$ and the caller $C_1$;
receiving a signal to access the recorded conference call from a caller $C_2$ indexed in the first group; and
transmitting the recorded conference call to caller $C_2$'s telecommunications terminal based, at least in part, on receiving the signal to access the recorded conference call from the caller $C_2$.

15. The method of claim 1, wherein the participant $P_1$ is a previous caller $C_3$ that previously received assistance regarding a topic associated with the first group.

16. The method of claim 15, wherein the participant $P_1$ previously received assistance regarding the topic from an Agent $A_2$.

17. The method of claim 15, wherein the participant $P_1$ is a previous caller $C_3$ that was previously indexed, by the call center, into the first group based, at least in part, on the information received from the caller $C_3$.

18. A method comprising:
receiving, by a call center, information from a caller $C_1$;
indexing, by the call center, the caller $C_1$ into a first group based, at least in part, on the information received, by the call center, from the caller $C_1$;
transmitting, by the call center, to a participant $P_1$, not in the call center, a first message requesting that the participant $P_1$ assist the caller $C_1$ indexed in the first group, wherein the first message is transmitted, by the call center, to the participant $P_1$ based, at least in part, on identifying that the participant $P_1$ is a participant of the first group;
establishing, by the call center, a conference call between the participant $P_1$ and the caller $C_1$ in response to the participant $P_1$ responding, to the call center, to the first message; and
connecting, by the call center, the caller $C_1$ with an agent $A_1$, in the call center, when a response to the first message is not received, by the call center, from the participant $P_1$.

* * * * *